June 25, 1935.　　　　O. RALL　　　　2,006,249
PROJECTING LAMP FOR MOTOR VEHICLES
Filed Jan. 20, 1933
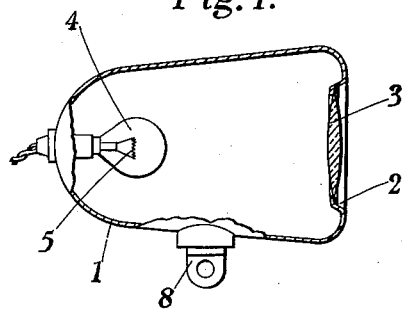
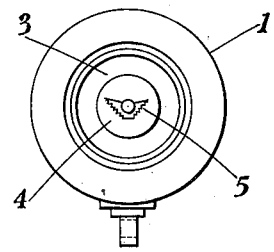
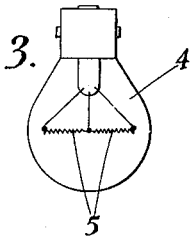
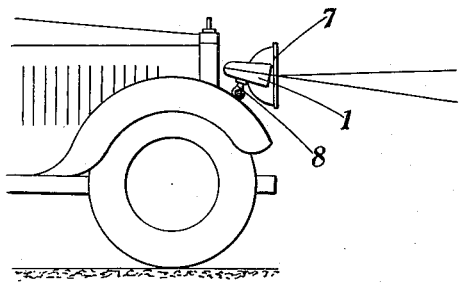
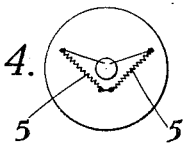
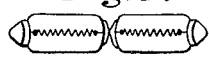
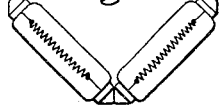
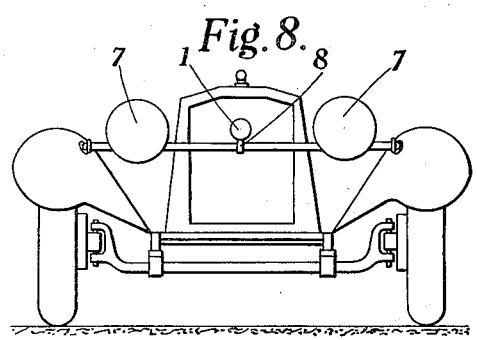
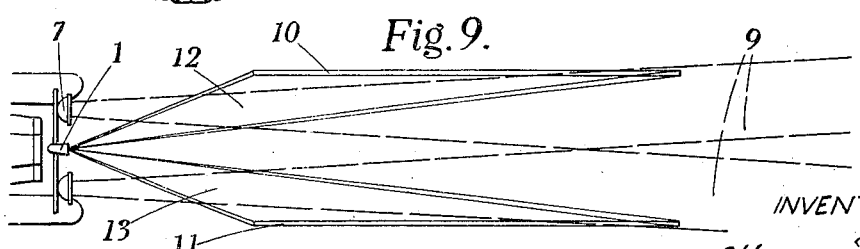
INVENTOR
Ottmar Rall
BY S. Sonal
ATTORNEY Patented June 25, 1935

2,006,249

UNITED STATES PATENT OFFICE 2,006,249

PROJECTING LAMP FOR MOTOR VEHICLES

Ottmar Rall, Zurich, Switzerland

Application January 20, 1933, Serial No. 652,615
In Switzerland November 19, 1932

2 Claims. (Cl. 240—7.1)

The present invention relates to projecting lamps for motor vehicles, more particularly motor cars, motor cycles and similar vehicles.

The numerous hitherto employed illuminating devices for motor cars, motor cycles and similar vehicles, such as projectors, curved lamps and spot lamps do not provide means for exactly indicating in sharply defined individual illuminated lines on the road the track width of the vehicle. For the motorist or motor cyclist the absence of such an indication is a great disadvantage. The said disadvantage exhibits itself particularly when the vehicles have to cross or to pass one another or to travel in curves on narrow streets and tracks, and still more particularly in the case of mountain roads or entries to parking places or garages, inasmuch as with the hitherto known devices the distances which have to be taken into account cannot be sufficiently accurately estimated, as a result of which many accidents in some cases serious accidents have been caused.

By way of example the case may be mentioned in which two motor cars have to cross one another at twilight or at night on a mountain road. In this case an inaccurate estimation of the small part of the road available for the driver might cause the most serious results.

It is the principal object of the present invention to provide means whereby the aforesaid great drawback in motoring and motor cycling is entirely avoided.

According to the invention a track light projecting device is provided which consists of one or more track light projectors each adapted to be rigidly fixed to or rotatably mounted by suitable means on the front or rear part of a vehicle, characterized in that it comprises means whereby the track width required by the vehicle is directly indicated on the road on which the vehicle is travelling, by means of two narrow brightly illuminating bands of light. The projector or projectors which is or are arranged at the front or at the back or at the front and also at the back may be, in the case of the front location, either stationary or positively connected with the axle of the steering wheel, or in the case of arrangement at the back may be mounted rigidly in the longitudinal axis of the vehicle. If the projector is mounted in the front of the vehicle so as to be rotatable, it may be coupled with the driving axles of the vehicle by means of known transmission gear in such manner that the bands of light indicating the track width are located exactly in the direction of the front or back wheels respectively. In this manner, travelling over curves, travelling at crossings and similar travelling operations are greatly facilitated and rendered safer.

Military cars having to execute journeys by night without illumination are enabled to fulfill their duties without any danger whilst being entirely covered up.

By means of the invention drivers of motor omnibuses when driving in towns over narrow streets in which they are frequently compelled to steer to one side to allow other vehicles to pass, are enabled, by means of the illuminating bands of light, to see at once without any risk of collision whether there is sufficient space for them to pass. The track light projector according to the invention also renders it possible for vehicles when running into parking places to draw up closer to one another entirely without difficulty or danger.

In the case of vehicles having a considerable distance between the wheels, such as motor omnibuses, motor mail vans or motor lorries, the bands of light indicating the track width may be broadened so as to correspond exactly with the track of the rear wheels.

A preferred constructional form according to the invention is illustrated by way of example on the accompanying drawing in which:

Fig. 1 is a side view of a track light projector according to the invention in section, Fig. 2 is a front view corresponding thereto, Fig. 3 is a side view of a lamp according to the invention having two incandescent filaments arranged at an angle of 90° to one another, Fig. 4 is a front elevation of the lamp shown in Fig. 3, Fig. 5 is a side view of two lamps employed in combination in the track light projector according to the invention, Fig. 6 is a front elevation of the lamps shown in Fig. 5, Fig. 7 is a partial side view of a motor car provided with a track light projector according to the invention, Fig. 8 is a front view corresponding to Fig. 7, and Fig. 9 is a partial plan of a motor car provided with a track light projector according to the invention, showing the projected bands of light.

Referring to the drawing:

The projector is provided with a lamp casing 1, the interior of which is matt and is coloured black, and which is furnished at the opening 2 for the emergence of the beam of light with a double convex lens 3 of about 8 diopters adapted to project the images of the incandescent filaments 5 of the lamp 4 in straight lines on to the street. The lamp 4 which may be a gas filled or vacuum lamp, is provided with two incandescent filaments 5 which extend in straight lines at an angle of 90° to one another. The said lamp, which is not yet available on the market, may also be replaced by two single tubular lamps, which must be mounted so that their longitudinal axes are at an angle of 90° to one another (Figs. 5 and 6). Both kinds of illuminating means are mounted in the lamp casing in such manner that the incandescent filaments are located at an angle of 90° to the longitudinal axis of the lamp casing, i. e. parallel to the double convex lens 3, so that the said filaments each make an angle of 45° with the vertical axis after the manner of the roman numeral V. The lamp casing 1 is mounted by means of a suitable support, between the head lights 7 exactly in the longitudinal axis of the vehicle in the case of motor cars. The lamp support 8 is constructed in such manner that it is rendered possible to incline the axis of the lamp and it is furthermore provided with a rotatable vertical bolt upon which the lamp is mounted. Fig. 9 shows the head lamps and the track light projector in operation. The head lights project a conical beam 9. The illuminating bands 10 and 11 which are located in the prolongation of the lines of the outer edges of the mudguards, are projected by the beams 12 and 13 of the projector 1 on to the street in such manner that the ends of the said bands located adjacent to the vehicle commence at about 4 to 5 metres from the latter so that they are easily visible without difficulty from the driver's seat over the hood.

I claim:

1. A track light projecting lamp for motor vehicles, comprising in combination: a casing arranged on the vehicle; a source of light in said casing comprising two linear incandescent filaments arranged at an angle to one another; and an objective for projecting images of said incandescent filaments in substantial alinement with the wheels of the vehicle, whereby two narrow brightly illuminated bands of light visible from a distance and indicating the track width required by the vehicle are projected on to the road on which the vehicle is travelling.

2. A track light projecting lamp for motor vehicles, comprising in combination: a non-reflecting casing arranged on the vehicle; a source of light arranged within said casing and comprising two electrically energized incandescent filaments constituting two sharply defined luminous bands; and a convex surfaced lens for projecting images of said two luminous bands in substantial alinement with the wheels of the vehicle on to the road on which the vehicle is travelling; whereby two narrow brightly illuminated thin bands of light visible from a distance and indicating the track width required by the vehicle are exhibited on the road, substantially as described.

OTTMAR RALL.